(12) United States Patent
Carpenter et al.

(10) Patent No.: US 8,234,331 B2
(45) Date of Patent: Jul. 31, 2012

(54) SYSTEM AND METHOD FOR SHIELDING OPEN PROCESS CONTROL CLIENT APPLICATIONS FROM BAD QUALITY INITIAL DATA

(75) Inventors: Seth G. Carpenter, Mesa, AZ (US); Anuradha Vidyashankar, Glendale, AZ (US); Timothy J. Fortin, Phoenix, AZ (US); Gary E. Bisenius, Glendale, AZ (US); Beulah S. David, Chandler, AZ (US)

(73) Assignee: Honeywell International Inc.

( * ) Notice: Subject to any disclaimer, the term of this patent is extended or adjusted under 35 U.S.C. 154(b) by 685 days.

(21) Appl. No.: 12/024,927

(22) Filed: Feb. 1, 2008

(65) Prior Publication Data

US 2009/0198349 A1  Aug. 6, 2009

(51) Int. Cl.
*G06F 15/16* (2006.01)
(52) U.S. Cl. .............. 709/203; 700/12; 700/79; 700/96; 718/102
(58) Field of Classification Search .......... 709/201–203, 709/223–224; 718/102; 700/79
See application file for complete search history.

(56) References Cited

U.S. PATENT DOCUMENTS

| | | | | |
|---|---|---|---|---|
| 5,914,716 A | * | 6/1999 | Rubin et al. ................ | 715/779 |
| 6,757,769 B1 | * | 6/2004 | Ofer ............................. | 710/200 |
| 7,447,761 B1 | * | 11/2008 | Ferguson et al. ............ | 709/224 |
| 7,489,977 B2 | * | 2/2009 | Duffy et al. .................. | 700/79 |
| 7,698,582 B2 | * | 4/2010 | Qin et al. ..................... | 713/300 |
| 2001/0018700 A1 | * | 8/2001 | Clarke et al. ................ | 709/102 |
| 2003/0050978 A1 | * | 3/2003 | Cannon et al. .............. | 709/204 |
| 2003/0121021 A1 | * | 6/2003 | Liu et al. ..................... | 716/19 |
| 2005/0096872 A1 | * | 5/2005 | Blevins et al. ............... | 702/183 |
| 2005/0226192 A1 | * | 10/2005 | Red et al. .................... | 370/338 |

FOREIGN PATENT DOCUMENTS

JP        2005018410 A    *  1/2005

* cited by examiner

*Primary Examiner* — Dustin Nguyen
(74) *Attorney, Agent, or Firm* — Jetter & Associates, P.A.

(57) ABSTRACT

A system (10) and method (200) for managing components in a control system can include a plurality of devices (150) operably coupled to a processing system (125) for controlling a process run by the processing system. A server (100) is in communication with the plurality of devices. A client (20) is in communication with the server (100), wherein the client (20) or an instance between the client and the server, such as controller (15), is operable to identify at least one relevant item associated with the plurality of devices (150). The at least one relevant item is one of a plurality of items to be added to a group, an inactive one of the plurality of items of the group being activated or one of the plurality of items of the group wherein the group is being activated. The client (20) or controller (15) obtains information from the server (100) and generates a determination whether the data associated with the at least one relevant item is a valid value or an invalid value, wherein valid values proceed directly to the client (20), while values determined to be invalid values are only allowed to reach the client (20) if they continue to be determined to be invalid values after the pre-determined time delay period has expired.

20 Claims, 2 Drawing Sheets

SYSTEM AND METHOD FOR SHIELDING OPEN PROCESS CONTROL CLIENT APPLICATIONS FROM BAD QUALITY INITIAL DATA

FIELD OF THE INVENTION

This disclosure relates generally to control or monitoring systems and more specifically to systems and methods of data management for clients such as OPC operators interfaced with servers, such as OPC servers.

BACKGROUND

Processing facilities, such as manufacturing plants, chemical plants and oil refineries, are typically managed using process control systems. Valves, pumps, motors, heating/cooling devices, and other industrial equipment typically perform actions needed to process materials in the processing facilities. Among other functions, the process control systems often manage the use of the industrial equipment in the processing facilities.

In conventional process control systems, controllers are often used to control the operation of the industrial equipment in the processing facilities. The controllers can typically monitor the operation of the industrial equipment and/or the products or related materials through use of various sensors, and provide control signals to the industrial equipment based on information retrieved from the various sensors.

To facilitate application of control techniques and improve interoperability of different devices and software, the OPC standard was introduced that specifies the communication of real-time plant data between control devices from different manufacturers. OPC is intended to bridge Windows-based applications and process control hardware and software applications. OPC is an open standard that permits a consistent method of accessing field data from plant floor devices that can remain the same regardless of the type and source of data. OPC servers can provide a method for many different software packages to access data from various process control devices, such as a programmable logic controller (PLC), or in a distributed control system (DCS). OPC can define a common interface that is written once and then reused by any business, Supervisory Control and Data Acquisition (SCADA) system, Human Machine Interface (HMI), or custom software packages. Once an OPC server application is written for a particular device, it can be reused by any application that is able to act as an OPC client.

In OPC, an "item" represents one of a plurality of data values that describe the states of the various devices. As known in the art, OPC-based systems as well as other control systems can experience problems during various changes to the system including activating an inactive item in a group or when activating an inactive group containing the item. The OPC standard recognizes that initial bad qualities are occasionally returned when subscribing to items. For example, after one or more items are first are added to a group, it may take some time for the server to obtain initial data values associated with the item. In such cases, the client might perform a read, such as from the cache and/or execute a refresh procedure on such a subscription before the items are available, which can result in an initial bad quality indication. When an item is not already present in the server's cache, the client can receive an immediate callback with a bad value which indicates some kind of failure of the underlying device. This bad value indication can cause various difficulties for the control process, such as a halt to a batch in progress which requires operator intervention to proceed. However, in some cases, initial data values carry bad quality even though the underlying device is performing normally, making halting the process and/or operator intervention unnecessary. Accordingly, there is a need for an apparatus and method for shielding OPC client applications from bad quality initial items.

SUMMARY

The Summary is provided to comply with 37 C.F.R. §1.73, requiring a summary of the invention briefly indicating the nature and substance of the invention. It is submitted with the understanding that it will not be used to interpret or limit the scope or meaning of the claims.

In one exemplary embodiment of the present disclosure, a method of controlling a process including an operator of the process connected to a server can involve identifying at least one relevant item from a group of items associated with the controlling of the process. The at least one relevant item is at least one of an item being added to the group, an inactive item of the group being activated or an item of the group wherein the group is being activated. It is determined if data associated with the at least one relevant item is a valid value based at least in part on monitoring stored material relating to the at least one relevant item, the information is then directly presented (i.e. without a pre-determined time delay period described below for presenting invalid data) to the operator indicating that the data is a valid value. Values determined to be invalid values are only allowed to reach the operator if they continue to be determined to be invalid values after the pre-determined time delay period has expired.

In another exemplary embodiment, a system for managing components in a control system can include a plurality of devices operably coupled to a processing system for controlling a process of the processing system. A server is in communication with the plurality of devices. A client is in communication with the server, wherein the client or an instance between the client and the server, such as controller, is operable to identify at least one relevant item associated with the plurality of devices. The at least one relevant item is one of a plurality of items to be added to a group, an inactive one of the plurality of items of the group being activated or one of the plurality of items of the group wherein the group is being activated. The client or instance obtains information from the server and generates a determination whether the data associated with the at least one relevant item is a valid value or an invalid value. Valid values proceed directly to the client, while values determined to be invalid values are only allowed to reach the client if they continue to be determined to be invalid values after a pre-determined time delay period has expired.

In a further exemplary embodiment, a computer-readable storage medium comprising computer-readable program instructions for controlling a process can include program instructions for causing a computer to identify at least one relevant item from a group of items associated with the controlling of the process, where the at least one relevant item is at least one of an item being added to the group, an inactive item of the group being activated or an item of the group wherein the group is being activated; program instructions for causing the computer to obtain information associated with the at least one relevant item from a server operably coupled to the at least one relevant item; program instructions for causing the computer to determine based at least in part on the information if data associated with the at least one relevant item is a valid value; program instructions for causing the computer to provide a pre-determined time delay period for the determining if an item determined to be an invalid value remains an invalid value; program instructions for causing the computer to present information indicating that the data is a valid value without waiting for the pre-determined time delay period when the data is determined to be a valid value; and program instructions for causing the computer to present information indicating that the data is an invalid value if the data is determined to be an invalid value and continues to be determined to be invalid values after the pre-determined time delay period has expired.

The technical effect includes, but is not limited to, allowing for seamless changes in a control system, including during a status change of one or more items or groups associated with the control system. The technical effect further includes, but is not limited to, reducing the need for unwarranted operator intervention.

The above-described and other features and advantages of the present disclosure will be appreciated and understood by those skilled in the art from the following detailed description, drawings, and appended claims.

DETAILED DESCRIPTION

Figure 1:
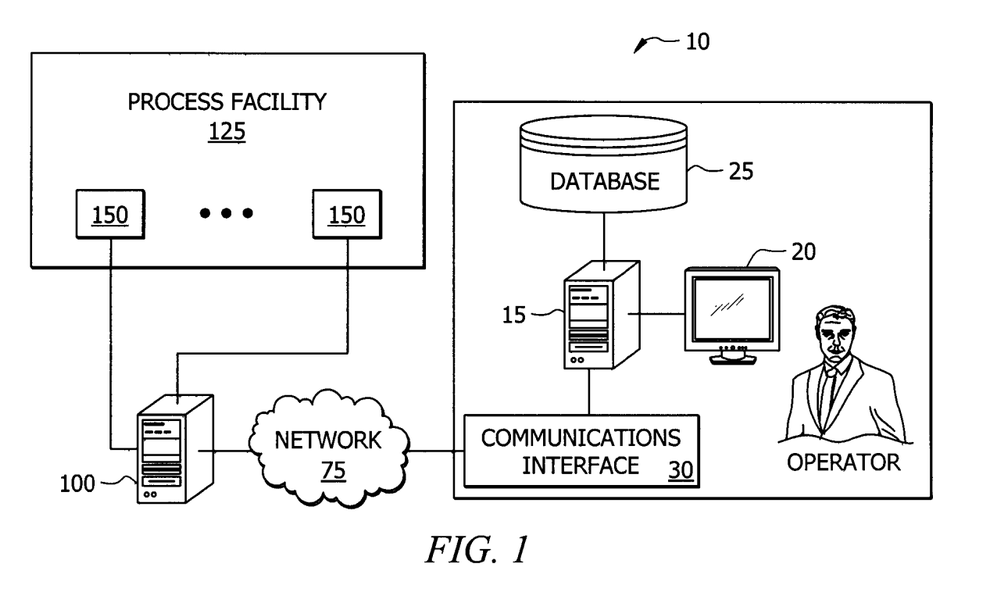
FIG. 1 is a schematic illustration of an exemplary system for process control according to an embodiment of the present invention.

In embodiments of the invention, an item determined to be a valid (good) value causes the method to proceed without further delay, and only bad values result in a time delay before being passed on to the client or operator. If an item continues to return a bad value after expiration of a timeout period, generally for the full length of the timeout period, then it is considered to be a legitimately bad value, and only then is the item passed on to the client or operator. Referring to the drawings, and in particular to FIG. 1, a control system is shown and generally represented by reference numeral 10. Control system 10 is operable to shield a client (e.g. an OPC client) from receiving initial bad data values and is generally widely applicable to clients connecting to servers (e.g. OPC servers). Control system 10 includes initial data quality screening or masking software according to embodiments of the invention (hereafter "IDQ software"), which can generally be implemented at the client level (at an OPC client), or an intermediate component or instance positioned between a client and server, such as the controller positioned between the OPC client and OPC server generally described relative to FIG. 1.

IDQ software according to embodiments of the invention includes algorithms that disable callbacks temporarily (e.g. for a predetermined time delay period) and occurs before any calls that generate callbacks. As a result, if present, bad initial values during the predetermined time delay period are prevented from going through the standard data path and thus being sent to the client.

As defined herein, as used in the context of OPC data, "receiving" refers to any data sent from an OPC server to an OPC client. The data might be in direct response to a client read request (e.g., client issues a read request, client waits for response from server, server responds with requested data), or it might be associated with a callback, which can be sent from the server to the client at any time. Callbacks are usually generated in response to subscriptions (when an active point is added to an active group, the server periodically updates the client with the value of that point) or asynchronous requests (e.g., client issues a read request but does not wait for a response from the server and immediately resumes other tasks; at some point the server will send the requested data as a callback).

The control system 10 can include a controller 15 that makes use of computing technology, such as a desktop computer 20 or scalable server, for controlling operations of the control system 10 with respect to one or more process facilities 125 (only one shown). The system 10 can also include a communications interface 30 that utilizes technology for communicating, such as over a network 75, with a server 100, such as an OPC server. Although only one server 100 is shown in FIG. 1, system 10 can include two or more servers (e.g. redundant servers). The controller 15 receives data from the processing facility 125 via server 100 and then can in one embodiment apply IDQ software which includes quality logic on behalf of the client application within communication interface 30. The client in system 10 could generally be an operator at a desktop computer 20. The control system 10 can further include a memory 25 (such as a high capacity storage medium) embodied in this illustration as a database. The network 75 can be various types and combinations of networks, such as wired and/or wireless networks, including a Local Area Network (LAN). The server 100 can be a client's device, such as a customer premises device (e.g. OPC server), in communication to receive items from one or more devices 150 of the process facility 125, such as PLCs, sensors, network communication devices and so forth. The present disclosure contemplates other configurations for the control system 10, including other configurations of the controller 15, server 100 and devices 150, such as having a plurality of one or more of these components or incorporating each of these components into a single facility.

In one embodiment, the control system 10 can operate as a distributed control system (DCS) conforming in part to protocols defined by standards bodies, such as OPC. In another embodiment, the controller 15 can operate utilizing a broad range of client, server and redundancy OPC technologies, such as an OPC client interface that integrates low-complexity subsystems, including PLCs, remote terminal units, single loop controllers, and so forth, that typically do not provide their own alarms; an OPC product that provides an open method that allows bi-directional data transfer between two or more OPC servers for supervisory monitoring, alarming and control (e.g., an OPC Double Headed Client); an OPC product that provides support for incorporating alarms and events from applications and third-party systems and works in conjunction with other OPC product(s) to provide full operations for third-party systems; an OPC Data Access Server that allows OPC Data Access Clients to access point data for purposes of control, plant-wide historization, and other data integration functions; an OPC product that provides access to alarms and events; and/or an OPC product that allows for access to redundant OPC server paths.

In yet another embodiment, the controller 15 can include an EXPERION™ Process Knowledge System (PKS) that utilizes OPC standards to provide data from the data source and communicate the data to any client application in a standard way, thereby eliminating the requirement for an application to have specific knowledge about a particular data source, such as its internal structure and communications protocols.

The IDQ software run, such as by controller 15 or by client 20, can provide a configurable timeout value or period. The timeout period can specify the maximum amount of time that should be waited for a point to change to a good or valid value before the point is considered legitimately bad and forwarded to the client 20. In one embodiment, a Mask Initial Bad Qualities option can be disabled by default by the software, and the timeout period can be set (and generally changed) if the option is enabled, such as by an operator.

The IDQ software can also prevent bad values from being prematurely being sent to a client 20, such as the desk top computer shown, during this initial timeout period. Control system 10 can implement this function anytime that a device 150 may generate an initial bad quality item. For example, when one or more items are first added to a group, such as through use of an IOPCItemMgt::AddItems call in the PKS application, control system 10 can prevent the initial bad quality items from being forwarded to client 20. As another example, when first activating an inactive item in a group, such as through use of an IOPCItemMgt::SetActiveState call in the PKS application, control system 10 can prevent the initial bad items from the activated item from being forwarded to the client 20. As yet another example, when a group containing one or more active items is changed from an inactive to an active state, such as through use of an IOPCGroupStateMgt::SetState call in the PKS application, control system 10 can prevent the initial bad items from being forwarded. In another embodiment, a refresh function, such as an IOPCAsyncIO2::Refresh2 call in the PKS application, could cause transmission of premature bad quality items. Control system 10 can prevent these initial bad items from being forwarded to client 20.

Figure 2:
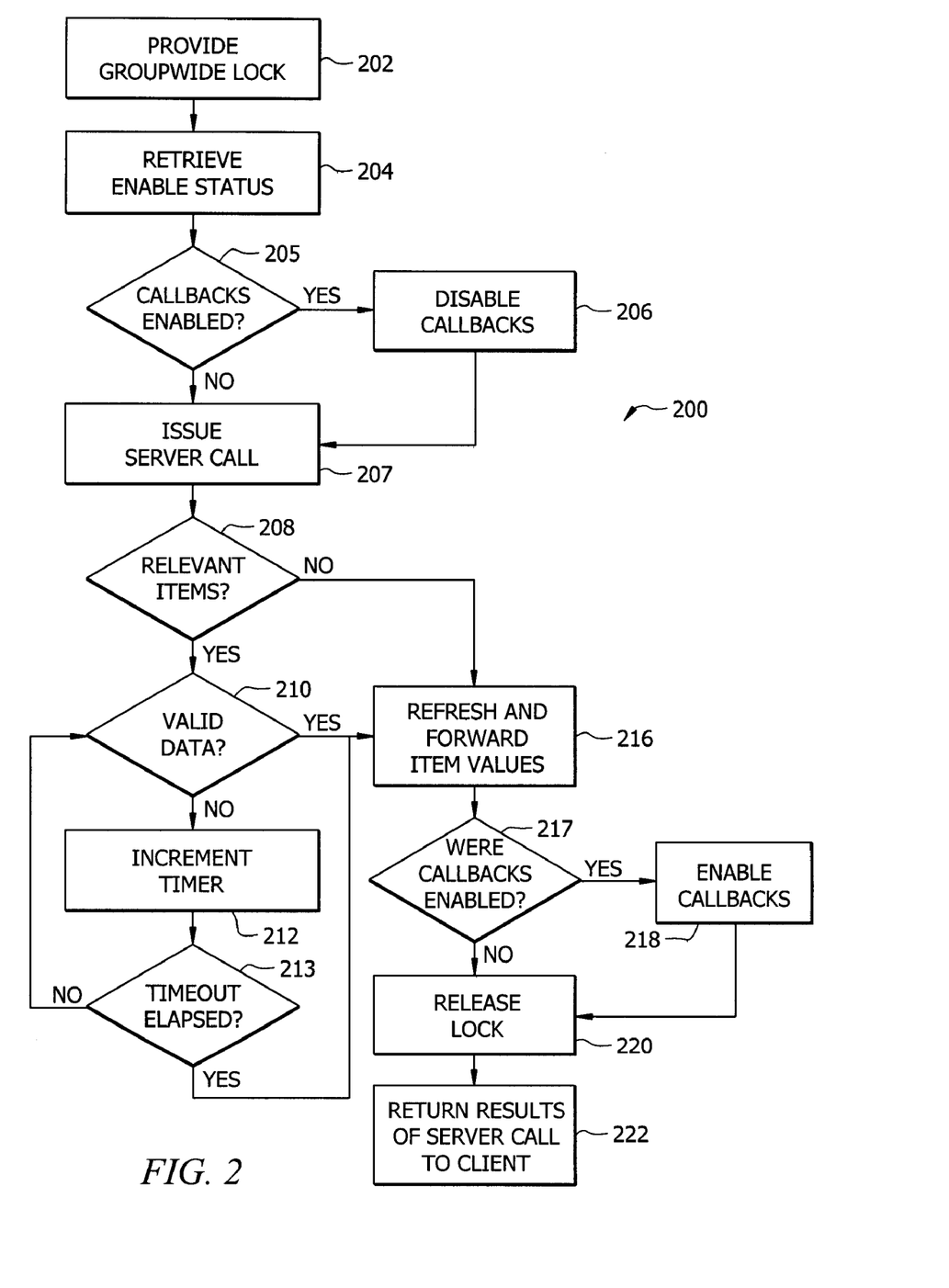
FIG. 2 is a flow chart illustrating an exemplary method for process control according to an embodiment of the present invention using the system of FIG. 1.

FIG. 2 depicts an exemplary method 200 operating in portions of the control system 10. It would be apparent to an artisan with ordinary skill in the art that other embodiments not depicted in FIG. 2 are possible without departing from the scope of the claims described below. Method 200 is described with reference to an OPC-based system and with steps being implemented at the OPC group level using object orientated programming, but the present disclosure contemplates the use of other standards, or outside of any standards, for applying control techniques to the processing facility 125, as well as implementation at other levels of the system, including using non-object orientated programming.

Method 200 can begin with step 202 in which the control system 10 provides a group-wide lock to prevent this method from being executed for the same group in a different thread, which could cause bad values to be prematurely sent to the client during a refresh function, such as a Refresh2 call in the PKS application. For example, in the PKS application, the group-wide lock can be used by AddItems, SetActiveState, SetState and Refresh2 calls to ensure that they do not occur concurrently.

In step 204, a pointer to the group's IOPCAsyncIO2 interface is obtained and IOPCAsyncIO2::GetEnable is called. The result of this call is used to determine whether callbacks are enabled in step 205. If the result from GetEnable is TRUE, the method proceeds to step 206, where callbacks are disabled by calling IOPCAsynchIO2::SetEnable(FALSE). This disables ordinary OnDataChange callbacks for the group from being sent, although any callbacks generated by IOPCAsyncIO2::Refresh2 will still be sent. The method then proceeds to step 207. If the result from GetEnable is FALSE, the method proceeds directly from step 205 to step 207. In step 207, the OPC call as described above is issued to the server.

In step 208, a list of the server handles (OPC handle references in the PKS application) affected by the call in step 206 is assembled which are the items successfully added to the group for AddItems, the items successfully activated for SetActiveState, or the active items in the group for SetState. If there are no relevant items identified, the method proceeds directly from step 208 to step 216.

In step 210, a pointer to the group's IOPCSyncIO interface can be obtained and IOPCSyncIO::Read can be called for the list of items assembled in step 208 with the results being examined and the memory allocated by the Read call being freed. This will determine if the server has valid data for the points in its cache. For example, using the PKS application the source for the read can be the OPC_DS_CACHE, but the present disclosure contemplates other memory sources being utilized for determination if the data point is of good or bad quality.

If the read in step 210 returned good qualities for all points (valid data), then method 200 can proceed to step 216 which comprises a refresh and forwarding of item values. Otherwise, in steps 212 and 213 the control system 10 keeps track of the time elapsed from this point forward in some manner and repeats step 210. This will continue until either the read returns good qualities for all items or the timeout period described above expires. To conserve resources and reduce load on the server, this can be accomplished by a loop which performs the read, checks the result, and either exits if successful or sleeps for a predetermined time (such as one second) and continues the loop until the timeout period is exceeded. The sleep periods allow the server time to poll the item associated with the points (e.g., this process can begin in the server after step 207) and store values in its cache or other memory.

In step 216, a refresh function can be performed, such as in the PKS application calling an IOPCAsyncIO2::Refresh2 with dwSource being the OPC_DS_CACHE. This is due to the callbacks being disabled during the previous steps, so updates for all points in the group were not sent. If a point were to change only during these operations, then the client would not be notified of the change in future callbacks. Calling refresh provides that any change during this period is sent to the client, and also provides that, in the case of multiple calls to the methods described above, the client will receive a callback at least once every timeout period.

In step 217 it is determined whether callbacks were enabled by reference to step 205. If the result from GetEnable in step 205 was TRUE, then OnDataChange callbacks for the group can be enabled again by calling IOPCAsyncIO2::SetEnable(TRUE). Otherwise, no additional call is made. In step 220, the lock acquired in step 202 can be released. In step 222, the results of the server call is returned to the client.

In the case of a client adding active items to an active group, such as through use of an AddItems call in the PKS application, the controller 15 may not permit returning the result of the call to the client until completing the steps of method 200. This allows for the callback generated by the Refresh2 call to be passed back to the client before it has received the server handles for the items added. In an OPC-based system, the standards describe this as being valid behavior, so client application should already be designed to handle this behavior. If the group does not have a subscription, then method 200 can skip steps 204, 205, 206, 216, 217 and 218 so that the Refresh2 and SetEnable calls will return CONNECT_E_NOCONNECTION.

The following describes the operation of system 10 and method 200 for various scenarios. In the descriptions for the scenarios, references are made to the item quality being good. These references mean that if the device represented by that point were polled, the returned quality would be good. This is independent of what the server has in its cache or other memory.

A first scenario involves adding active items to an active group on the server, where bad initial qualities may be seen if the items added are not already in the server's cache. If the items are added inactive or added to an inactive group, OnDataChanges will not be received for those items and bad initial values may not be seen, so those scenarios are not considered in this scenario (i.e., the IDQ software can use the same logic for AddItems as if the Mask Initial Bad Quality setting were disabled).

As a starting condition for this scenario, the client is assumed to be connected to the controller 15 which was successfully connected to the primary OPC server 100. The IDQ software is configured with the Mask Initial Bad Quality enabled and the maximum timeout set to 5 seconds. The client has already added an active group and added an item to that group. The client is now trying to add several items to the same group.

In case 1 for this first scenario, the items added have good qualities and are already in the server cache. The IDQ software can examine the group and the items added to verify that all are active, and can use the Mask Initial Bad Quality logic. The IDQ software can then disable callbacks for the group (callbacks for the item already in the group will not be received until callbacks are enabled again and the refresh call is made). The IDQ software can forward the AddItems call to the active server and extract a list of the active items that were successfully added to the group, perform a synchronous cache read for those items, and verify that all return good values. The IDQ software can call a refresh, enable callbacks for the group and return the results of the AddItems call to the client. The client can then receive a callback containing data for the items added and the item already in the group, all with good values. In case 1, the client will continue receiving callbacks as normal, according to the update rate set, from this point.

In case 2 for this first scenario, the items added have good qualities, but are not present in the server cache and the cache will be populated within two seconds of a successful AddItems call. The IDQ software can examine the group and the items added, verify that all are active, and use the Mask Initial Bad Quality logic. The IDQ software can disable callbacks for the group (callbacks for the item already in the group will not be received until callbacks are enabled again and the refresh call is made). The IDQ software can then forward the AddItems call to the active server. The IDQ software can extract a list of the active items that were successfully added to the group, perform a synchronous cache read for those items, and verify that they return bad values. The IDQ software can sleep for one second and repeat the read step above, which may also return bad values. The IDQ software can sleep for another one second period (total time waited is now 2 seconds) and repeat the read step above, which should now return good values. The IDQ software can call a refresh, enable callbacks for the group and return the results of the AddItems call to the client. The client can receive a callback containing data for the items added and the item already in the group, all with good values. In case 2, the client will continue receiving callbacks as normal, according to the update rate set, from this point.

In case 3 for the first scenario, the items exist, but have bad qualities (flow of events will be the same whether the items are present in the server's cache or not). The IDQ software can examine the group and the items, verify that all are active, and use the Mask Initial Bad Quality logic. The IDQ software can disable callbacks for the group (callbacks for the item already in the group will not be received until callbacks are enabled again and the refresh call is made). The IDQ software can then forward the AddItems call to the active server. The IDQ software can extract a list of the active items that were successfully added to the group, perform a synchronous cache read for those items, and verify that they return bad values. The IDQ software can sleep for one second and repeat the read step above, which may also return bad values. The IDQ software can continue to sleep for one second and perform a synchronous read as above until the maximum wait time has elapsed (e.g., 4 more reads for a total of 5 seconds elapsed). The IDQ software can call a refresh, enable callbacks for the group and return the results of the AddItems call to the client. The client can receive a callback containing data for the items added and the item already in the group, which will contain bad values for the items just added. In case 3, the client will continue receiving callbacks as normal, according to the update rate set, from this point.

In case 4 for the first scenario, the items added do not exist on the server. The IDQ software can examine the group and the items added, verify that all are active, and use the Mask Initial Bad Quality logic. The IDQ software can disable callbacks for the group (callbacks for the item already in the group will not be received until callbacks are enabled again and the refresh call is made). The IDQ software can forward the AddItems call to the active server. The IDQ software can then verify that none of the active items were successfully added to the group, so no synchronous reads are performed. The IDQ software can call a refresh, enable callbacks for the group and return the results of the AddItems call to the client. The client can receive a callback containing data for the items already in the group. In case 4, the client will continue receiving callbacks as normal, according to the update rate set, from this point.

A second scenario involves activating items in an active group on the server, where bad initial qualities may be seen if the items activated are not already in the server's cache. If the items are in an inactive group, OnDataChanges will not be received for any items in the group and bad initial values will not be seen, so those scenarios are not considered in this scenario.

As a starting condition for this scenario, the client is assumed to be connected to controller 15 which was successfully connected to the primary server 100. The IDQ software is configured with the Mask Initial Bad Quality enabled and the maximum timeout set to 5 seconds. The client has already added an active group and has several inactive items in that group. The client is now attempting to activate those items.

In case 1 for the second scenario, items activated have good qualities and are already in the server cache. The IDQ software can examine the group, verify that it is active, and use the Mask Initial Bad Quality logic. The IDQ software can disable callbacks for the group and forward the SetActiveState call to the active server. The IDQ software can extract a list of the items that were successfully activated, perform a synchronous cache read for those items, and verify that all return good values. The IDQ software can call a refresh, enable callbacks for the group and return the results of the SetActiveState call to the client. The client can receive a callback containing data for the items activated, all with good values. In case 1, the client will continue receiving callbacks as normal, according to the update rate set, from this point.

In case 2 for the second scenario, the items activated have good qualities, but are not present in the server cache and will be populated within two seconds of a successful SetActiveState call. The IDQ software can examine the group, verify that it is active, and use the Mask Initial Bad Quality logic. The IDQ software can disable callbacks for the group and forward the SetActiveState call to the active server. The IDQ software can extract a list of the items that were successfully activated, perform a synchronous cache read for those items, and verify that they return bad values. The IDQ software can then sleep for one second and repeats the read step above, which may also return bad values. The IDQ software can then sleep for one second (total time waited is now 2 seconds) and repeat the read step above, which now returns good values. The software associated with controller 15 can call a refresh, enable callbacks for the group and return the results of the SetActiveState call to the client. The client can receive a callback containing data for the items activated, all with good values. In case 2, the client will continue receiving callbacks as normal, according to the update rate set, from this point.

In case 3 for the second scenario, the items exist on the server but have bad qualities (flow of events will be the same whether the items are present in the server's cache or not). The IDQ software can examine the group, verify that it is active, and use the Mask Initial Bad Quality logic. The IDQ software can disable callbacks for the group and forward the SetActiveState call to the active server. The IDQ software can extract a list of the active items that were successfully activated, perform a synchronous cache read for those items, and verify that they return bad values. The IDQ software can sleep for one second and repeat the read step above, which may also return bad values. The IDQ software can continue to sleep for one second and perform a synchronous read as above until the maximum wait time has elapsed (e.g., 4 more reads for a total of 5 seconds elapsed). The IDQ software can call a refresh, enable callbacks for the group and return the results of the SetActiveState call to the client. The client can receive a callback containing data for the items activated, which will contain bad values for the items just activated. In case 3, the client will continue receiving callbacks as normal, according to the update rate set, from this point.

In case 4 for the second scenario, the items activated do not exist on the server (e.g., the points in the group have been deleted from the server). The IDQ software can examine the group, verify that it is active, and use the Mask Initial Bad Quality logic. The IDQ software can disable callbacks for the group and forward the SetActiveState call to the active server. The IDQ software can verify that none of the items in the call were successfully activated (as they do not exist on the server), so no synchronous reads are performed. The IDQ software can call a refresh, enable callbacks for the group and return the results of the SetActiveState call to the client. The client can receive a callback containing data for any active items that were already in the group. In case 4, the client will continue receiving callbacks as normal, according to the update rate set, from this point.

A third scenario involves activating an inactive group containing active items on the server where bad initial qualities will be seen if the active items are not already in the server's cache. If no items in the group are active, OnDataChanges will not be received for any items in the group and bad initial values will not be seen, so those scenarios are not considered in this scenario. SetState can be used to modify other attributes of a given group, but the Mask Initial Bad Quality option only affects SetState calls which activate a group, so other uses of SetState (including deactivation of groups) are not considered here.

As a starting condition for this scenario, the client is assumed to be connected to controller 15 which was successfully connected to the primary server 100. The IDQ software is configured with the Mask Initial Bad Quality enabled and the maximum timeout set to 5 seconds. The client has already added an inactive group and has several active items in that group. The client is now attempting to activate the group.

In case 1 for the third scenario, active items in the group have good qualities and are already in the server cache. The IDQ software can examine the SetState call and verify that the group is being activated. It then can examine the group being activated, verify that the group contains active items, and use the Mask Initial Bad Quality logic. The IDQ software can disable callbacks for the group and forward the SetState call to the active server. The IDQ software can verify that the group was activated, extract a list of the active items in the group, perform a synchronous cache read for those items, and verify that all return good values. The IDQ software can call a refresh, enable callbacks for the group and return the results of the SetState call to the client. The client can receive a callback containing data for all active items in the group, all with good values. In case 1, the client will continue receiving callbacks as normal, according to the update rate set, from this point.

In case 2 for the third scenario, active items in the group have good qualities, but are not present in the server cache which will be populated within two seconds of a successful SetState call. The IDQ software can examine the SetState call and verify that the group is being activated. It can then examine the group being activated, verify that it contains active items, and use the Mask Initial Bad Quality logic. The IDQ software can disable callbacks for the group and forward the SetState call to the active server. The IDQ software can verify that the group was activated, extract a list of the active items in the group, perform a synchronous cache read for those items, and verify that they return bad values. The IDQ software can sleep for one second and repeat the read step above, which may also return bad values. The IDQ software can sleep for another one second period (total time waited is now 2 seconds) and repeat the read step above, which now returns good values. The IDQ software can call a refresh, enable callbacks for the group and return the results of the SetState call to the client. The client can receive a callback containing data for all active items in the group, all with good values. In case 2, the client will continue receiving callbacks as normal, according to the update rate set, from this point.

In case 3 for the third scenario, items exist, but have bad qualities (flow of events will be the same whether the items are present in the server's cache or not). The IDQ software can examine the SetState call and verify that the group is being activated. It can then examine the group being activated, verify that it contains active items, and use the Mask Initial Bad Quality logic. The IDQ software can disable callbacks for the group and forward the SetState call to the active server. The IDQ software can verify that the group was activated, extract a list of the active items in the group, perform a synchronous cache read for those items, and verify that they return bad values. The IDQ software can sleep for one second and repeat the read step above, which also returns bad values. The IDQ software can then continue to sleep for one second and perform a synchronous read until the maximum wait time has elapsed (e.g., 4 more reads for a total of 5 seconds elapsed). The IDQ software can call a refresh, enable callbacks for the group and return the results of the SetState call to the client. The client can receive a callback containing data for all active items in the group, which will contain bad values. The client will continue receiving callbacks as normal, according to the update rate set, from this point (OnDataChange's will not be generated if items remain bad, just as in normal operation).

In case 4 for the third scenario, the items activated do not exist on the server (e.g., the points in the group have been deleted from the server). The IDQ software can examine the SetState call and verify that the group is being activated. It can then examine the group being activated, verify that it contains active items, and use the Mask Initial Bad Quality logic. The IDQ software can disable callbacks for the group and forward the SetState call to the active server. The IDQ software can verify that the group was activated, extract a list of the active items in the group, and perform a synchronous cache read for those items. The server can indicate that items referenced are invalid, and the client can skip subsequent reads. The IDQ software can call a refresh, enable callbacks for the group and return the results of the SetState call to the client. In case 4, the client will continue receiving callbacks as normal, according to the update rate set, from this point.

The use of the full timeout periods can cause a delay up to the value set as the timeout period for each invocation in method 200. To reduce any delay, method 200 allows for either modifying the client to add all the items in a single call or by adding the items to an inactive group, then activating the group. For example, if the AddItems or SetActiveState are invoked once for each item with a timeout period of 6 seconds, and the client were to add one hundred items one at a time, the operations could take as long as ten minutes to complete. By adding all the items in a single call or by adding the items to an inactive group, this time period can be reduced to six seconds.

Control systems according to embodiments of the invention can be used with various processing facilities and various processes, such as manufacturing processes, chemical plants and oil refineries. The particular type of facility and the particular type of process that is to be controlled is not intended to be limited. Control systems according to embodiments of the invention can provide for control of a multi-variable process. In one embodiment, control systems according to embodiments of the invention can be applied to a non-linear process, but the present disclosure also contemplates the use of the control system for implementing control in linear processes.

The present disclosure also contemplates the use of a computer system within which a set of instructions, when executed, may cause the machine to perform any one or more of the methodologies discussed above. The computer instructions can be embodied in a storage medium. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, the term "machine" shall be taken to include a single machine or any collection of machines that individually or jointly execute a set (or multiple sets) of instructions to perform any one or more of the methodologies discussed herein.

The computer-readable storage medium can have stored thereon one or more sets of instructions (e.g., software) embodying any one or more of the methodologies or functions described herein, including those methods illustrated above. The computer-readable storage medium can be an electromechanical medium such as a common disk drive, or a mass storage medium with no moving parts such as Flash or like non-volatile memories. The instructions may also reside, completely or at least partially, within a main memory, a static memory, and/or within a processor during execution thereof by the computer system. The main memory and the processor also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein. The present disclosure contemplates a machine readable medium containing instructions, or that which receives and executes instructions from a propagated signal so that a device, such as connected to a network environment can send or receive data, and to communicate over the network using the instructions.

While the computer-readable storage medium can be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed as the best mode contemplated for carrying out this invention, but that the invention will include all embodiments falling within the scope of the appended claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A method of controlling a process including an operator of the process connected to a server, the method comprising:
    identifying at least one relevant item from a group of items associated with the controlling of the process, the at least one relevant item being at least one of an item being added to the group, an inactive item of the group being activated or an item of the group wherein the group is being activated;
    determining if data associated with the at least one relevant item is a valid value or an invalid value, and
    directly presenting information to the operator when the data is determined to be a valid value and delaying presentation of the information to the operator when the data is determined to be an invalid value, wherein an invalid value is presented to the operator after a pre-determined time delay period has expired only if the data remains an invalid value after the time delay period has expired.

2. The method of claim 1, further comprising determining if a masking function for masking initial bad quality is desired by the operator of the process and presenting information prior to the expiration of the time delay period indicating that the data is an invalid value when the data is not determined to be a valid value and when the masking function is not desired.

3. The method of claim 1, further comprising enabling a lock to the group during the time delay period, wherein the lock prevents a masking function being performed when the lock is enabled, wherein the masking function comprises the steps of identifying the at least one relevant item, determining if the data is a valid or invalid value, providing the time delay period and presenting the information.

4. The method of claim 1, further comprising polling the at least one relevant item during the time period for information associated with the data.

5. The method of claim 4, wherein the server polls the at least one relevant item for the information associated with the data.

6. The method of claim 1, wherein said method further comprises said operator issuing a read call to said server before said identifying, and wherein when said quality value is determined to be said bad quality value, repeating said read call and said determining during said pre-determined time delay period.

7. The method of claim 1, wherein the steps of identifying the at least one relevant item and determining if the data is a valid or an invalid value are performed using object oriented programming.

8. The method of claim 7, wherein the at least one relevant item is a plurality of items and further comprising the step of adding the plurality of items in a single call.

9. The method of claim 7, wherein the at least one relevant item is a plurality of items and further comprising the step of adding the plurality of items to an inactive group and then activating the group.

10. A control system for controlling processing systems, the control system comprising:
    a plurality of devices operably coupled to a processing system for controlling a process of the processing system;
    a server in communication with the plurality of devices; and
    a client in communication with the server, wherein the client or a controller between the client and the server is operable to identify at least one relevant item associated with the plurality of devices, wherein the at least one relevant item is one of a plurality of items to be added to a group, an inactive one of the plurality of items of the group being activated or one of the plurality of items of the group wherein the group is being activated,
    wherein the client or controller obtains information from the server and generates a determination whether the data associated with the at least one relevant item is a valid value or an invalid value, wherein valid values proceed directly to the client, while values determined to be invalid values are only allowed to reach the client if they continue to be determined to be invalid values after a pre-determined time delay period has expired.

11. The system of claim 10, wherein the client is operable to identify the at least one relevant item.

12. The system of claim 10, wherein the system includes the controller, the controller being operable to identify the at least one relevant item.

13. The system of claim 12, wherein the controller has a user interface and being in communication with the server, wherein the controller obtains information from the server to determine if data associated with the at least one relevant item is a valid or an invalid value, wherein the controller transmits a first signal to the user interface when the data is a valid value, and wherein the controller transmits a second signal to the user interface indicating that the data is an invalid value after the pre-determined time delay period has expired when the data is determined to be an invalid value and after the pre-determined time delay period has expired.

14. A computer-readable storage medium, comprising:
    computer-readable program instructions stored on non-transitory computer-readable storage media for controlling a process, said program comprising:
        program instructions for causing a computer to identify at least one relevant item from a group of items associated with the controlling of the process, the at least one relevant item being at least one of an item being added to the group, an inactive item of the group being activated or an item of the group wherein the group is being activated;
        program instructions for causing said computer to obtain information associated with the at least one relevant item from a server operably coupled to the at least one relevant item;

program instructions for causing said computer to determine based at least in part on the information whether data associated with the at least one relevant item is a valid or an invalid value;

program instructions for causing said computer to provide a pre-determined time delay period for the determining if an item determined to be an invalid value remains an invalid value;

program instructions for causing said computer to present information indicating that the data is a valid value when the data is determined to be a valid value without waiting for the pre-determined time delay period when the data is determined to be a valid value; and program instructions for causing the computer to present information indicating that the data is an invalid value if the data is determined to be an invalid value and continues to be determined to be invalid values after the pre-determined time delay period has expired.

15. The computer-readable storage medium of claim 14, further comprising computer instructions for causing said computer to determine if a masking function for masking initial bad quality is desired and present information prior to the expiration of the time delay period indicating that the data is an invalid value when the data is not determined to be a valid value and when the masking function is not desired.

16. The computer-readable storage medium of claim 14, further comprising computer instructions for causing said computer to enable a lock to the group during the time delay period, wherein the lock prevents a masking function being performed when the lock is enabled, wherein the masking function comprises the steps of identifying the at least one relevant item, determining if the data is a valid or an invalid value, providing the time period and presenting the information.

17. The computer-readable storage medium of claim 14, further comprising computer instructions for causing said computer to send a polling request to the server, wherein the polling request causes the server to poll the at least one relevant item during the time delay period for the information.

18. The computer-readable storage medium of claim 14, wherein the information associated with the at least one relevant item is read from a memory cache of the server.

19. The computer-readable storage medium of claim 14, wherein the at least one relevant item is a plurality of items and further comprising computer instructions for causing said computer to perform at least one of adding the plurality of items in a single call or adding the plurality of items to an inactive group and then activating the group.

20. A method of controlling a process run in a processing plant comprising plant floor devices including an open process control operator of the process connected to an open process control server, the method comprising:

said open process control client issuing a read call to said open process control server;

responsive to said read call said open process control server returning at least one relevant item from a group of items that each contain a quality item associated with plant data received from sensors or controllers that are communicably coupled to said plant floor devices for controlling the process, the relevant item being at least one of an item being added to the group, an inactive item of the group being activated, or an item of the group wherein the group is being activated;

determining if said quality value associated with the relevant item is a good quality value or a bad quality value, and when said quality value is determined to be said good quality value, directly presenting said relevant item to said open process control client, and when said quality value is determined to be said bad quality value:

delaying presentation of the relevant item to said open process control client and repeating said read call and said determining during a pre-determined time delay period, wherein when said quality value continues to return said bad quality value during said repeating, said relevant item is first presented to said open process control client only after said pre-determined time delay period has expired.

* * * * *